United States Patent [19]
Gardner

[11] Patent Number: 6,016,097
[45] Date of Patent: Jan. 18, 2000

[54] MOTION TRANSDUCER

[75] Inventor: David J. Gardner, Farmington Hills, Mich.

[73] Assignee: Eaton Corporation, Cleveland, Ohio

[21] Appl. No.: 08/924,014

[22] Filed: Aug. 29, 1997

[51] Int. Cl.⁷ .................................................. H01C 10/10
[52] U.S. Cl. ................................ 338/47; 338/2; 338/39; 338/42; 338/5; 73/746
[58] Field of Search .................................. 338/2, 5, 6, 39, 338/47, 93, 96, 98, 99, 105, 114; 73/746, 862.627, 862.629, 862.632; 345/168, 174

[56] References Cited

U.S. PATENT DOCUMENTS

| | | | |
|---|---|---|---|
| 3,090,226 | 5/1963 | Corti et al. | 73/862.627 |
| 4,267,725 | 5/1981 | Roth et al. | 73/862.629 |
| 4,653,329 | 3/1987 | Sagara et al. | 73/726 |
| 4,821,013 | 4/1989 | Iida | 338/114 |
| 4,847,586 | 7/1989 | Tanaga et al. | 338/114 |
| 5,146,791 | 9/1992 | Peter et al. | 73/862.627 |
| 5,162,775 | 11/1992 | Kuramochi et al. | 338/114 |
| 5,353,003 | 10/1994 | Maurer | 338/47 |
| 5,499,041 | 3/1996 | Brandenburg et al. | 345/174 |

*Primary Examiner*—Michael L. Gellner
*Assistant Examiner*—Karl Easthom
*Attorney, Agent, or Firm*—Roger A. Johnston

[57] ABSTRACT

A motion transducer having a user moveable plunger which compresses a spring for generating a force proportional to plunger displacement and applying the generated force to an actuator telescoped onto the plunger. The actuator has an elastomeric pad on the surface which contacts and reacts the generated force onto a force/pressure sensitive resistive strip which varies its resistance with the changing force applied by the elastomeric pad. The changes in resistance may be electrically detected to give an indication of plunger travel.

8 Claims, 2 Drawing Sheets

MOTION TRANSDUCER

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to devices known as transducers which provide an electrical signal output or indication, when connected in a circuit, of a mechanical or other physical non-electrical input such as motion or force to provide an interface between a physical or mechanical system and an electrical circuit.

Devices of this type are employed where it is desired to provide an electrical indication of a physical quantity to be monitored or measured on a continuous or running basis without the need to record values and reset or restart the measuring device. In particular, transducers are employed to provide an indication of motion or continuously varying displacement. In certain applications, it is desired to have user-effected movement of a control member as the mechanical input with an electrical signal as the output which has the characteristics thereof varied or changed, so as to provide a discrete electrical indication of different positions of the member.

Known movement or displacement transducers have utilized potentiometers and variable resistors employing wipers moved over stationary resistance material to vary the overall resistance of the device. Typically, the variable resistance device is connected in one leg or arm of a Wheatstone bridge circuit. This electrical bridge arrangement provides the desired electrical sensitivity to small changes in resistance representative of a small displacement of the input member to thereby provide the desired accuracy of measurement or control. Alternatively, a microcomputer can be used with a lookup table of predetermined relationships between the property measured or displacement being tracked and the electrical resistance.

However, variable wiper type potentiometers have inherent disadvantages in that they are expensive to fabricate and subject to variation in the electrical resistance due to changes in the wiping surfaces and degradation over time in service. Accordingly, it has been desired to provide a motion or displacement transducer which has a high degree of sensitivity to small displacements and which provides a reliable and repeatable electrical signal and which is low in manufacturing cost.

BRIEF SUMMARY OF THE INVENTION

The present invention provides a motion or displacement transducer which yields, upon connection to an external circuit, an electrical indication which is proportional to the position of a user moveable input member provided on the device. The device of the present invention utilizes a variable resistance of the type which is force/pressure sensitive to surface contact and eliminates the need for a wiper.

It is an object of the present invention to provide a transducer which provides a variable electrical resistance signal in response to user movement of an input member on the device.

It is another object of the present invention to provide a position or movement transducer which utilizes a force/pressure sensitive resistor to provide a variable resistance electrical signal in response to user movement of an input member.

It is a further object of the present invention to provide a position transducer which outputs an electrical variable resistance signal responsive to user movement of a push-button type input member and which employs a force/pressure responsive resistor eliminating the need for a wiper.

The transducer of the present invention employs a force/pressure responsive resistive strip or device subjected to a variable force by an actuator which is biased against the strip with a normal force proportional to movement of the input member. The normal force is generated by a capsule including a telescoping plunger and actuator spring biased in opposite directions. With the actuator contacting the resistive strip device, user movement of the plunger compresses the spring to a reaction force on the resistive device proportional to the movement of the plunger.

DETAILED DESCRIPTION OF THE INVENTION

Figure 1:
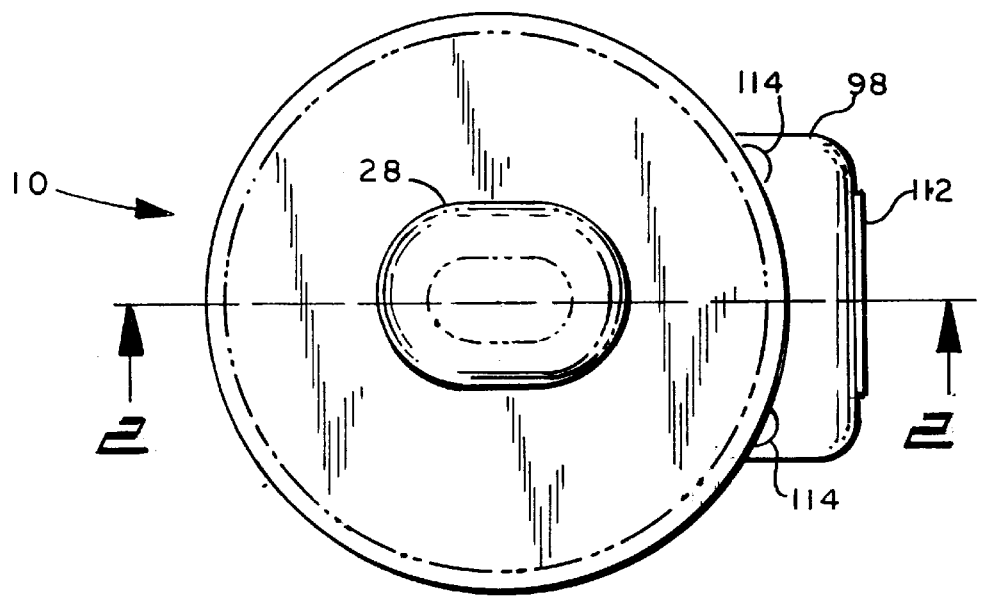
FIG. 1 is a top or plan view of the transducer of the present invention.
Figure 2:
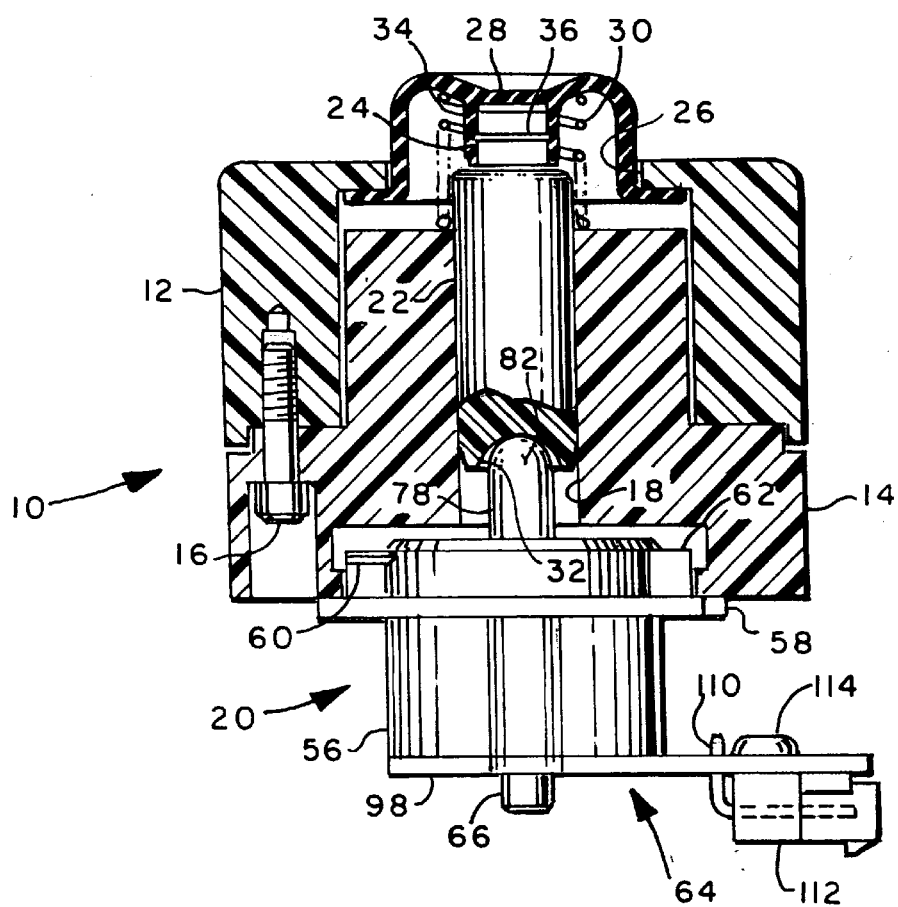
FIG. 2 is a section view taken along section indicating lines 2—2 of FIG. 1.

Referring to FIGS. 1 and 2, the transducer assembly of the present invention is indicated generally at 10 and includes housing means including an upper housing or body member 12, a lower body or housing member 14, attached thereto by suitable fasteners such as screws 16 disposed circumferentially thereabout, one of which is illustrated at 16. A capsule indicated generally at 20 is attached to the lower body 14. A user actuated input member comprising rod 22 is slidably received in lower body 14 in a bore 18 and has a post portion 24 extending exteriorly of upper housing 12 through an aperture 26 formed therein.

If desired, rod portion 24 may have a flexible membrane 28 or cap 28 received thereover with the periphery of the membrane flanged to engage the undersurface of aperture 26 to limit upward travel of membrane 28 and to provide a dust and moisture seal about the rod 22. A central hub portion 34 of membrane 28 engages rod portion 24 over an annular rib 36 provided thereon.

A return spring 30 is received over the upper end of rod 22, with one reaction end registered on the upper surface of lower body 14; and, the opposite reaction end is registered on the undersurface of member 28. Spring 30 biases the membrane 28 upwardly; and, hub 34 thereof lifts rod 22 in an upward direction. Spring 30 has a relatively low spring rate with respect to other springs in the assembly 10. The lower end of rod 22 has a generally dished recess 32 formed therein.

Figure 3:
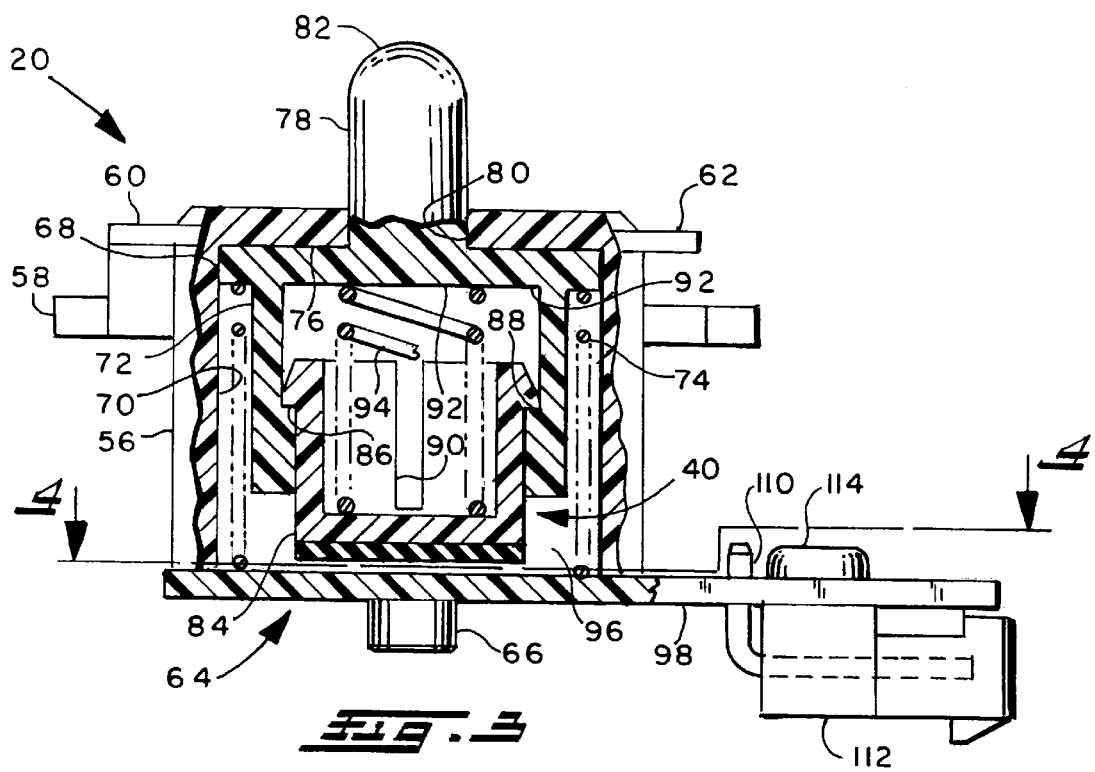
FIG. 3 is an enlarged view of the lower portion of FIG. 2 with portions broken away to show the interior components; and, FIG. 4 is a section view taken along section indicating lines 4—4 of FIG. 3.
Figure 4:
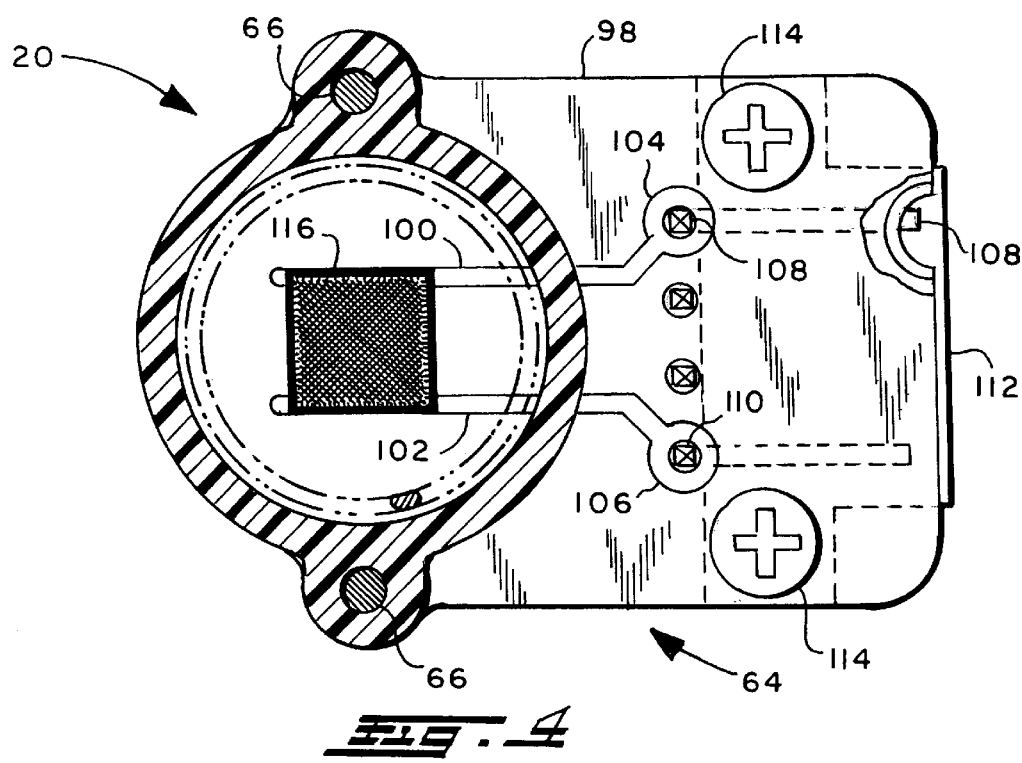

Referring to FIGS. 3 and 4, the capsule 20 of the assembly 10 is shown as having an outer shell 56 which has an enlarged diameter flange 58 provided around the upper portion thereof adjacent the upper end, which flange serves to register the capsule against the undersurface of lower body 14. The capsule shell 56 is retained in the lower body 14 by any convenient expedient, as for example, via twist locking tabs 60, 62 extending outwardly from the upper end of the shell 56.

The body shell 56 of capsule 20 has attached to the lower surface thereof a circuit board assembly indicated generally at 64. Board assembly 64 is secured to the lower surface of the body shell 56 by suitable fastening expedients such as screws 66 thereby closing bore 70. It will be understood however, the capsule body shell 56 may alternatively be formed integrally with lower body 14, if desired.

Referring to FIG. 3, the capsule 20 is shown in detail as having a plunger member 68 slidably received in a bore 70 provided in the shell 56; and, the plunger 68 has a reduced diameter hollow cylindrical portion 72 extending axially downwardly from the upper portion 68. The cylindrical portion 72 of first plunger 68 serves as a pilot or guide and has a spring 74 received thereover with the upper end of the spring registered against the undersurface of portion 68; and, the opposite reaction end or lower end of spring 74 is registered against the upper surface of the circuit board assembly 64.

The spring 74 biases the plunger 68 upwardly to its limit of travel against the undersurface 76 of the upper wall of shell 56. In the present practice of the invention, the spring constant or spring rate of the spring 74 is relatively low with respect to the other springs of the assembly and serves only to return the plunger to the upward limit of its travel.

The plunger 68 has an upwardly extending projection or post 78 which extends exteriorly of the shell 56 through an aperture 80 formed in the upper wall 76. It will be understood that the post 78 is formed integrally with the plunger 76 in the presently preferred practice. Post 78 has a preferably hemispherical surface 82 formed on the upper end thereof which contacts the dished recess 32 in the lower end of rod 22.

The hollow cylindrical portion 72 of plunger 68 has slidably received therein a generally cup-shaped actuator 84, or second plunger which is limited in its downward or outward travel, with respect to plunger 68, by a barbed annular surface 86 provided on the outer surface thereof. Barbed surface 86, or second stop surfaces, registers against an annular shoulder 88, or first stop surfaces, formed in the interior of the cylindrical portion 72 of plunger 68. It will be understood that the actuator 84 is slotted as denoted by reference numeral 90 about its periphery to permit radial compression of the cylindrical wall thereof to permit assembly of the barbed surface 86 into the interior of the cylindrical portion 72 of the plunger 68.

A force bias spring 94 is disposed interiorly of the plunger and actuator 84 and has its upper end registered against the undersurface 92 of the upper portion of plunger 68. The opposite reaction end or lower end of spring 94 is registered against the interior of the closed end of actuator 84 to bias the actuator downwardly or in an outward direction with respect to plunger 68.

It will be understood that the plunger 68 with spring 94 received therein has the actuator snap locked together over the spring to form a force generating means comprising a sub-assembly indicated generally at 40. Sub-assembly 40 is assembled as a unit in bore 70 of outer shell 56 with port 78 extending through aperture 80.

The lower surface of the closed end of the actuator 84 has provided thereon an elastomeric pad 96 which is secured thereto by any suitable expedient, as for example, adhesive bonding or double-sided tape.

In the present practice of the invention the pad 96 has a thickness of about one millimeter and is formed of preferably silicone elastomer and preferably has a hardness of about 65 as measured on a shore "A" scale. The pad 96 serves to provide a resilient load distributing surface for contacting the printed circuit board assembly 64.

Referring to FIG. 4, the circuit board assembly 64 includes a printed circuit board 98 which has a pair of spaced generally parallel conductive strips 100, 102 provided thereon, each of which terminates in a loop denoted respectively 104, 106. Each of the loops 104, 106 has disposed therein, through an aperture in the board 98, an electrical connector pin denoted respectively 108, 110 which is electrically connected to the loop by a suitable expedient such as, for example, soldering. The pins 108, 110 each extend downwardly through the circuit board 98 and are formed at right angles to extend through an electrical receptacle 112 which is retained on the undersurface of the circuit board by screws 114 passing through the board, and illustrated as having their heads on the upper surface of the board 98. It will be understood that the pins 108, 110 are adapted to connect the device 116 to a circuit (not shown) such as an arm of a Wheatstone bridge circuit by external connection through connector 112.

Referring to FIG. 4, a force/pressure responsive resistive device 116 in the form of a thin strip which bridges the contacts 100, 102 and is electrically connected therewith. In the present practice of the invention, the device 116 comprises a thin layer or strip of conductive material separated from another thin layer or strip of conductive material with a superposed layer of resistive material thereover such that increased surface contact pressure thereon causes a conductive layer to be pressed thereon and to effect a decrease in the resistance measured between the strips 100, 102. Such devices are well known in the art and are formed of pressure transducer ink screened on dielectric material to form a thin strip-like resistive device.

Referring to FIGS. 1 to 4 in operation, the user pushes on membrane 28 moving rod 22 downwardly such that recess 32 contacts the end 82 of plunger 68. Continued movement of rod 22 causes plunger 68 to move downwardly compressing spring 94 and increasing the force of the elastomeric pad 96 against the force/pressure sensitive resistive device 116. In the presently preferred practice of the invention, the spring rate or constant of the spring 94 is chosen to be significantly higher than spring 74. It will be understood that the extended length of sub-assembly 40 is such that, upon assembly into bore 70 and attachment of board assembly 64 to shell 56, no force is applied to device 116 until contact of pad 96 with device 116 upon user depression of membrane 28.

The present invention thus provides a reliable, simple to manufacture and relatively low cost motion transducer which utilizes a force/pressure sensitive resistive device and eliminates the need for wiping contact.

The invention has been described and illustrated with respect to a resistive force/pressure responsive device; however, it will be understood that a capacitive force/pressure responsive device could be substituted for the device 116 to achieve the same results where an alternating current electrical signal is employed.

Although the invention has hereinabove been described with respect to the illustrated embodiments, it will be understood that the invention is capable of modification and variation and is limited only by the following claims.

I claim:

1. A motion transducer assembly comprising:
   (a) body means having an actuator moveably disposed therein and having portions thereof accessible exteriorly of said body means and adapted for user imparted movement thereof;
   (b) a capsule having a housing removably attached to said body means, and including,
      (i) a force/pressure sensitive electrical means aperture to change to electrical impedance upon application of force/pressure thereto;
      (ii) a first plunger operatively contracted by said actuator and moveable thereby and including first stop surfaces;
      (iii) a second plunger slidably received on said first plunger, and including second stop surfaces limiting movement of said second plunger with respect to said first plunger;
      (iv) a spring biasing said second plunger, in a direction to causing said second stop surfaces to contact said first stop surfaces; and,
   (c) electrical terminal means connected to said electrical means, and adapted for external electrical circuit connection thereto wherein, upon user movement of said actuator, said first plunger is moved causing said second plunger to contact said electrical means, and upon continued movement of said actuator, said contact is broken between said first and second stop surfaces and overtravel is absorbed by relative movement of said first and second plunger and said spring effects increasing force of said second plunger on said electrical means.

2. The transducer defined in claim 1, wherein said electrical means comprises a pressure sensitive resistive device.

3. The transducer defined in claim 1, wherein said spring comprises a coil spring.

4. The transducer defined in claim 1, wherein said first plunger has a cup-shaped configuration.

5. The transducer defined in claim 1, wherein said second plunger has a cup-shaped configuration.

6. The transducer defined in claim 1, wherein said capsule includes a circuit board.

7. The transducer defined in claim 1, wherein said first and second plunger are disposed in telescoping arrangement.

8. The transducer defined in claim 1, wherein said first and second plunger and said spring are assembled in a telescoping sub-assembly.

* * * * *